(12) United States Patent
Weinholt et al.

(10) Patent No.: US 7,567,501 B2
(45) Date of Patent: Jul. 28, 2009

(54) EMBEDDED KEYING

(75) Inventors: Dan Rutger Weinholt, Västra Frölunda (SE); Per-Olof Gerhard Gustavsson, Pixbo (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 544 days.

(21) Appl. No.: 10/519,610

(22) PCT Filed: Jul. 3, 2002

(86) PCT No.: PCT/SE02/01325

§ 371 (c)(1), (2), (4) Date: Jan. 4, 2006

(87) PCT Pub. No.: WO2004/006528

PCT Pub. Date: Jan. 15, 2004

(65) Prior Publication Data

US 2006/0159191 A1    Jul. 20, 2006

(51) Int. Cl.
*H04L 5/12* (2006.01)
(52) U.S. Cl. .......... 370/204; 370/207; 375/261
(58) Field of Classification Search ......... 370/204, 370/206, 207, 215; 375/261, 298
See application file for complete search history.

(56) References Cited

U.S. PATENT DOCUMENTS

| | | | |
|---|---|---|---|
| 5,684,842 A | 11/1997 | Daffara et al. | |
| 5,724,382 A * | 3/1998 | Maruyama | 375/141 |
| 5,771,224 A * | 6/1998 | Seki et al. | 370/206 |
| 5,796,786 A | 8/1998 | Lee | |
| 6,256,487 B1 * | 7/2001 | Bruhn | 455/352 |
| 6,353,637 B1 * | 3/2002 | Mansour et al. | 375/260 |
| 6,490,270 B1 * | 12/2002 | Krishnamoorthy et al. | 370/347 |
| 2001/0001008 A1 * | 5/2001 | Dent | 375/271 |

FOREIGN PATENT DOCUMENTS

| | | |
|---|---|---|
| EP | 0734132 | 9/1996 |
| EP | 0734132 A2 | 9/1996 |
| EP | 1021019 | 7/2000 |
| EP | 1021019 A1 | 7/2000 |
| WO | WO 9956442 | 11/1999 |
| WO | WO 9956442 A2 | 11/1999 |

* cited by examiner

*Primary Examiner*—Min Jung

(57) ABSTRACT

Method of communicating digital data in which frames (8) are transmitted cyclically whereby a first number of symbols is transmitted according to a first keying mode (H) using a first constellation, and a second number of symbols is transmitted according to a second keying mode (L) using a second constellation. The first and second keying modes (H, L) are used at predetermined positions in the frame, whereby both the symbols according to the first and second keying mode carry information under at least an operative traffic phase.

14 Claims, 10 Drawing Sheets

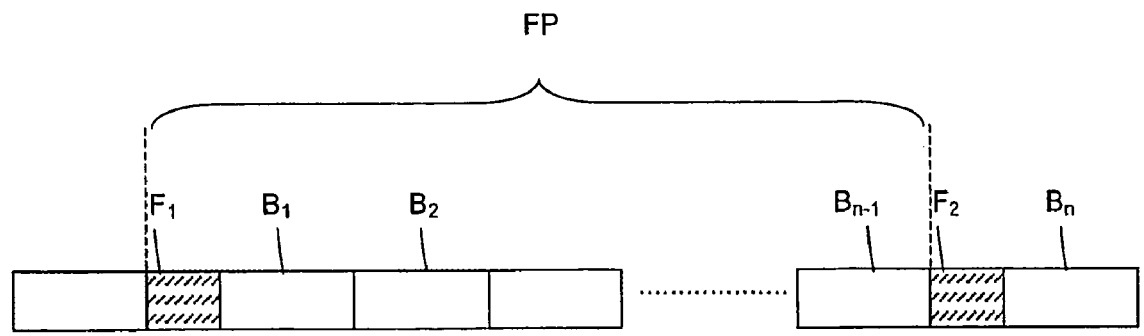
Fig. 3
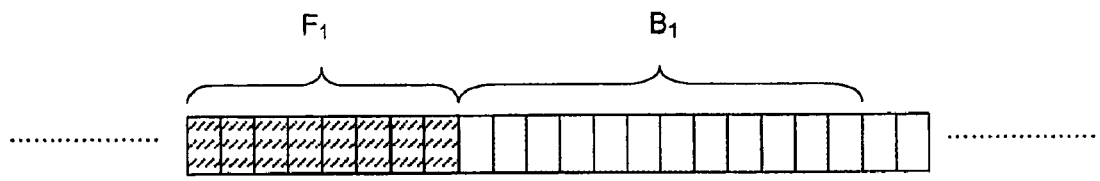
Fig. 4
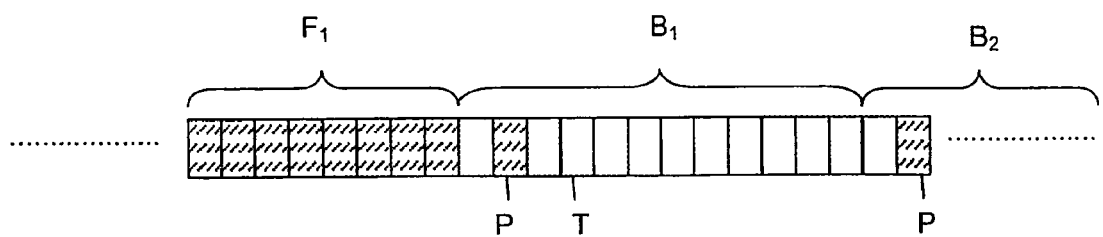
Fig. 4'
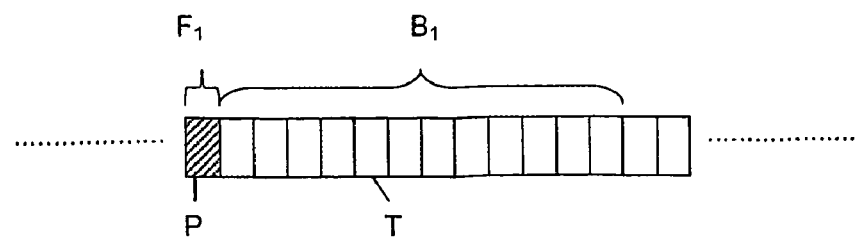
Fig. 4"

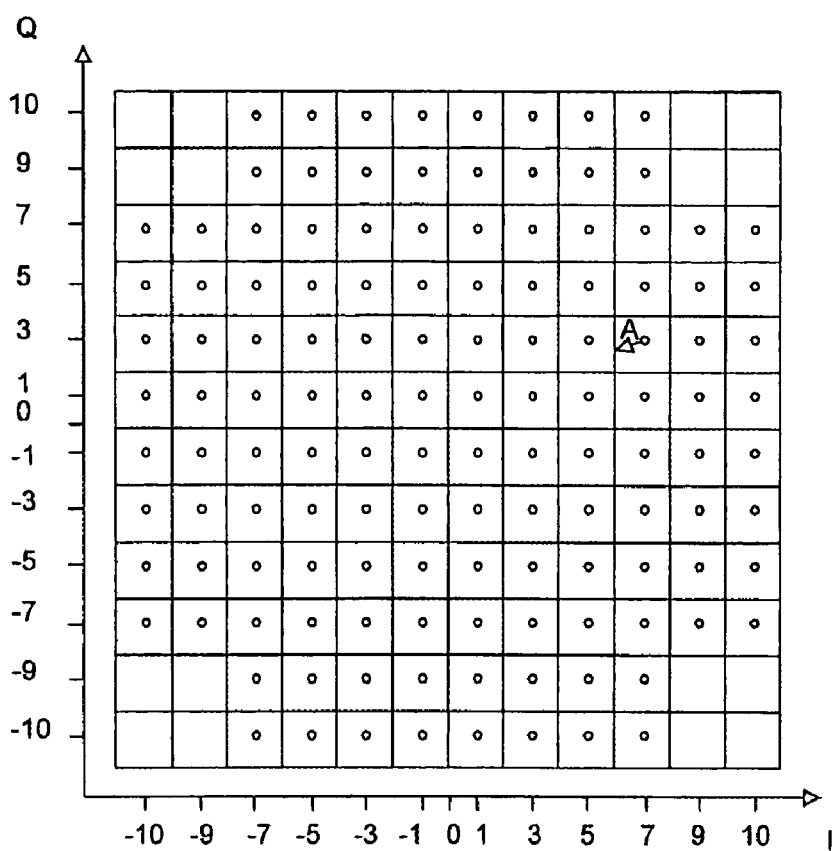
Fig. 5 - 128 QAM
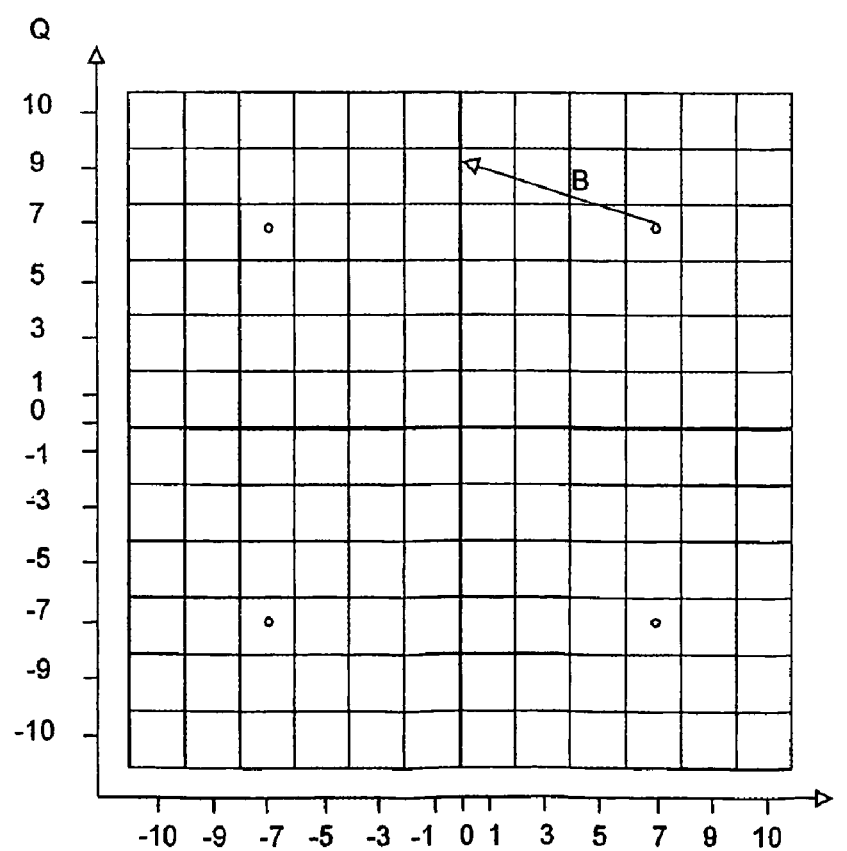
Fig. 6 - QAM

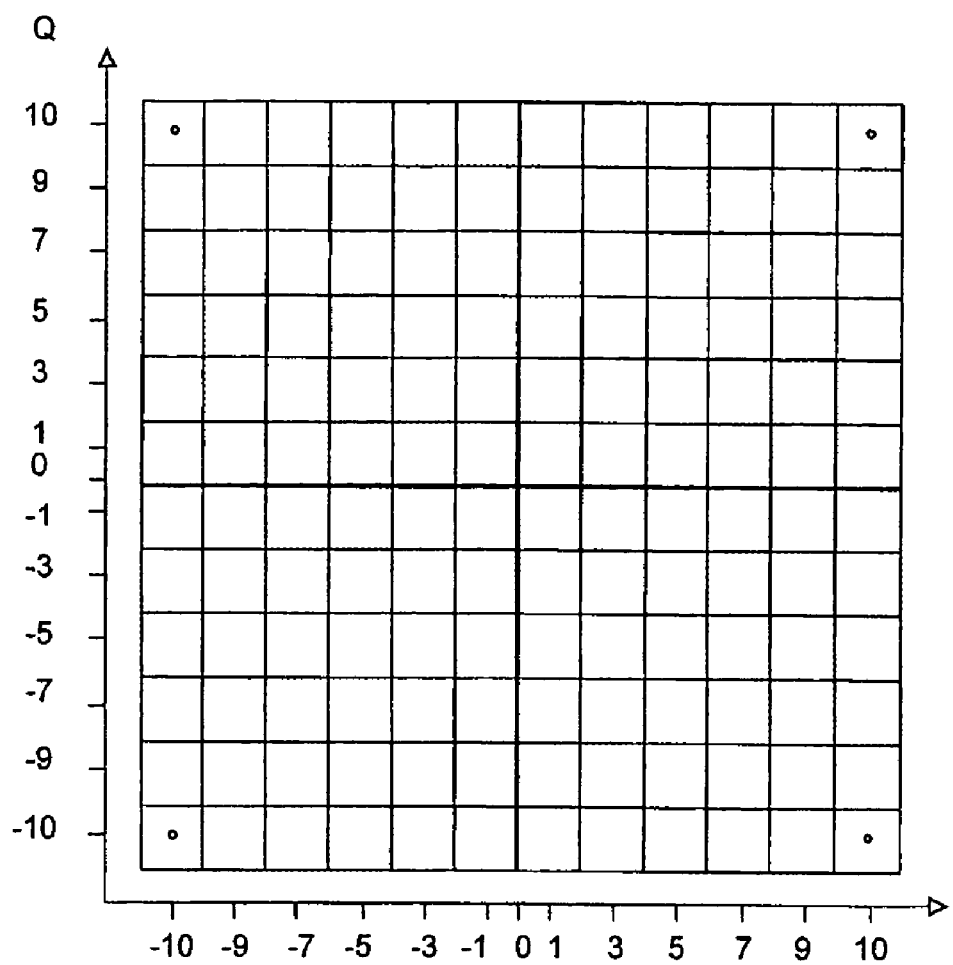
Fig. 7 - 4-QAM

| sequnce order | n-1 | n | n+1 | n+... | n+t | n+t+1 |
|---|---|---|---|---|---|---|
| modu-lation | 4 | 128 | 128 | ... | 4 | 128 |
| data bit | 2 | 7 | 7 | .... | 2 | 7 |

EMBEDDED KEYING

FIELD OF THE INVENTION

The present invention relates to principles of phase modulation coding and decoding, which may be utilised in various types of telecommunication systems. The invention is especially applicable for radio communication systems.

BACKGROUND OF THE INVENTION

A commonly used principle for transmitting data over a radio channel and for overcoming the signal rate limitation of binary sequence signalling is to make use of four or more unique symbols. Thereby, the bit rate can exceed the maximum signal rate (in bits/s) corresponding to double the passband (in Hz) as given by the Nyquist theorem.

Quadrature phase shift keying (QPSK) also denoted 4-state quadrature amplitude modulation (4-QAM) involves that two-bit words are coded into four discrete symbols. These symbols can be represented as signal vectors in the complex plane having constant amplitude but four distinct phase values in relation to a reference signal. Detection is carried out by establishing which of four quadrants in the complex plane the received signal can be referred to.

If a higher modulation order is used, the bit rate can be increased further. However, higher requirements are inflicted on the detection stage since it becomes more difficult to detect the individual symbols from one another, as they appear closer in the complex plane. The deterioration of the signal as transmitted over a given media also constitutes a limitation to the possible number of symbols being used.

Higher order keying is commonly referred to as M'ary QAM, where $M=2^N$ refers to the number of discrete symbols being available, whereby N bits can be transmitted per symbol. M'ary QAM is also referred to as M'ary APK (amplitude phase shift keying), as both the amplitude and phase may vary for individual symbols.

FIG. 1 shows a conventional transmitter and FIG. 2 shows a conventional receiver.

The transmitter unit comprises a data buffer 1, a mapper 2, baseband filtering unit 3, intermediate frequency (IF) oscillator 6, phase divider 5, adders 7, and summer 4 from which a radio frequency (RF) signal is transmitted.

Data stored temporarily in buffer 1 is conveyed to the mapper 2 in accordance with the rate data can be transmitted over the radio interface. The data, which can be seen as a binary bit serial string, is partitioned into symbols by the mapper 2 having an I component and Q component in the complex plane as explained above.

The receiver, on the other hand, decodes I and Q components multiplying the incoming signal (RF) with 90 degree phase skewed signals provided by signal oscillator IF12 from divider D11. The signal of IF 12 is typically rendered coherent by means of a carrier recovery PLL (phase locked loop) with the carrier signal from IF 6, such that the RF signal, after being filtered in respective filters 9 and 10, can be decoded back into the complex plane. An error signal E corresponding to the deviation of the detected symbol value from an expected symbol value is fed into PLL loop back filter 13 adjusting IF generator IF 12.

FIGS. 3 and 4 show a conventional scheme for transmitting data. A frame alignment word F1 consisting of a predetermined sequence of symbols functions as a reference for subsequent frames of traffic data B1, B2 . . . BN−1. For example, the frame-word may have a length of 8 bits. After transmission of a fixed period of frames, the frame alignment word is repeated. Via a frame-aligner 15, in which the predetermined sequence is recovered, the demodulator, can identify the individual frame position for each frame.

As shown in FIG. 4', each frame following the frame alignment word may include a pilot signal.

As is shown in FIG. 4", the frame alignment word may comprise a single pilot signal, which is discernible from the remaining symbols.

In known systems, the frame alignment word (or pilot signal) may for instance appear for every 20.000 symbols.

Since pilot signals are associated with "spectral peaks", and therefore may disturb other channels or systems, the frequency at which pilot signals occur is normally restricted.

By definition, frame alignment words and pilot signals do not contain any traffic information (payload) and are therefore regarded as an overhead to the information being transmitted.

Forward error correction (FEC) methods can advantageously be used to restore the signal content where the signal to noise ratio impairs the signal. However, as is known, FEC implies using some redundancy or overhead to the information being transmitted.

Prior art document EP1022874 discloses an apparatus for digital data transmission, utilising for instance M'ary QAM. A frame configuration is used in which a pilot symbol, i.e. a signal carrying no traffic data, is inserted for every N−1 information symbols. The receiver estimates the phase, amplitude variation and frequency offset on the I-Q plane from the pilot symbol, by inserting for instance three pilot signals in a row. In order to increase transmission efficiency, symbols immediately before and after a single pilot symbol are modulated according to a modulation type different from the pilot modulation type. A method is shown for differentiating the modulation type for modulating pilot symbols from the modulation type for modulating symbols immediately before and after a pilot symbol, which includes placing two or more signal points of each one symbol immediately before and after a pilot symbol on a virtual line connecting the pilot signal point and the origin in the in-phase I—quadrature Q plane. According to one embodiment of the above document (FIG. 13), the pilot symbol and the symbols immediately before and after the pilot symbol coincide with symbols of a 64-QAM-modulation scheme used for data transmission.

SUMMARY OF THE INVENTION

It is a first object of the invention to set forth a method, which provides for a robust, high bit rate data transmission, which is also bandwidth efficient, and which lessens requirements on the hardware.

This object has been accomplished by the subject matter set out in claim 1.

It is a further object to set forth a method of transmitting data, which provides further bandwidth efficiency.

This object has been accomplished according to claim 2.

It is a further object to provide for robust symbol detection and error compensation, while transmitting information.

This object has been accomplished by claim 3.

It is a further object to set forth an improved method for frame alignment.

This object has been achieved by the subject matter of claim 9.

It is a further object to further optimise the transmission efficiency by adapting to varying channel conditions.

This object has been achieved by claim 10.

It is a further object of the invention to reduce the negative effects of thermal noise in the receiver stage.

This object has been achieved by the subject matter of claim 13.

Further advantages will appear from the following detailed description of preferred embodiments of the invention.

BRIEF DESCRIPTION OF THE DRAWINGS

FIG. 3 shows a typical known frame timing diagram,
FIG. 4 s a detail of FIG. 3,
FIG. 4' and 4" show other known frame timing diagrams,
FIG. 5 shows a 128QAM-keying constellation,
FIG. 6 shows a QAM keying constellation being imbedded in the complex plane of FIG. 5 according to a first embodiment of the invention,
FIG. 7 shows a QAM keying constellation being imbedded in the complex plane of FIG. 5 according to a second embodiment of the invention.

DETAILED DESCRIPTION OF A PREFERRED EMBODIMENT OF THE INVENTION

Figure 1:
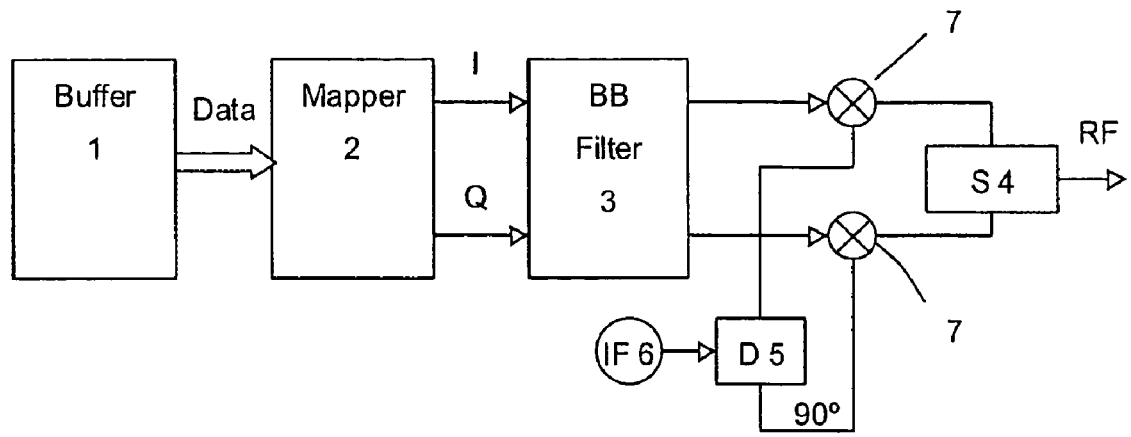
FIG. 1 shows an outline of a conventional transmitter.
Figure 2:
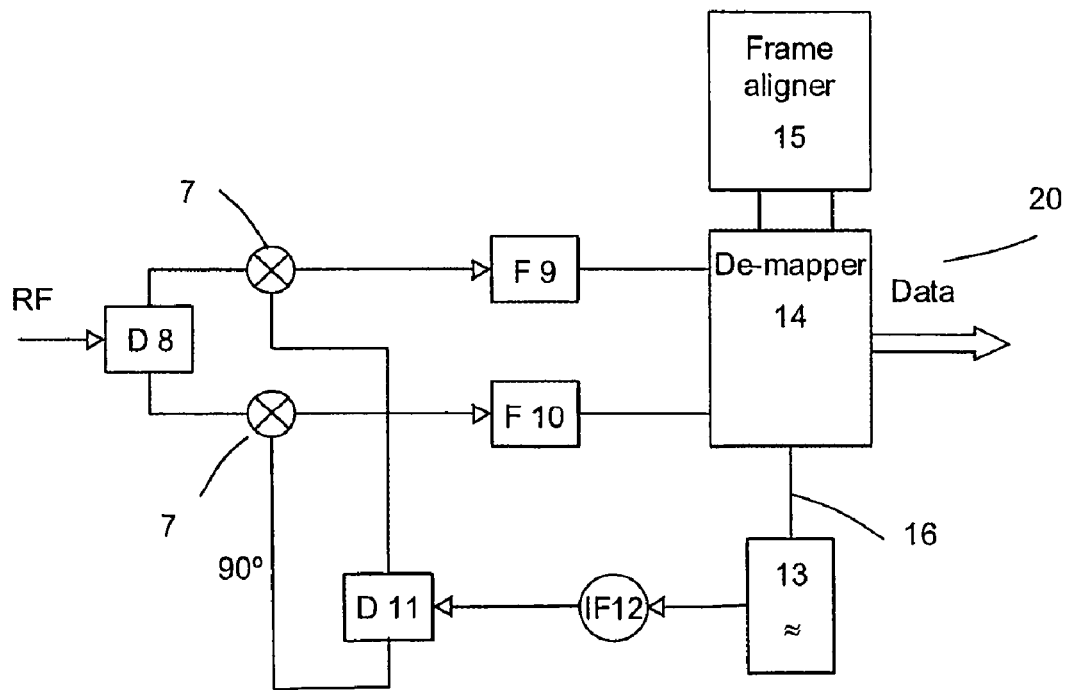
FIG. 2 shows an outline of a conventional receiver.

The present invention utilises a transmitter and receiver that could be outlined as shown in FIGS. 1 and 2. Reference numbers pertaining to figures and 1 and 2 will be used in the following for explaining the invention.

According to the invention, data is mapped into the complex plane by utilising at least two keying modes. According to a first embodiment of the invention, a first keying mode utilising the symbols shown in FIG. 5 is used for symbols n to n+t−1. Subsequently, a second keying mode corresponding to the symbols in FIG. 6 is used for the symbol n+t. Thereafter, the first keying mode is used for the subsequent symbols and subsequently, data is mapped according to the second keying mode.

By way of example, the first keying mode, H, could correspond to 128QAM coding. As can be seen, both the phase and the amplitude of the signal vary. Words of 7 bit of data is transferred from the buffer 1 and mapped into 128 distinct symbols, also denoted signalling points, by mapper 2.

The second keying mode L corresponds to a lower keying mode than the first keying mode. For instance, the second keying mode could correspond to 4QAM keying. In the second keying mode, two-bit data words from buffer 1 are mapped into four symbols, also denoted signalling points, arranged in the four respective quadrants in the complex plane. It is noted that the symbols (7, 7; 7, −7; −7, 7; −7, −7) of the second keying mode coincide with four symbols of the first keying mode shown in FIG. 5. Hence, the second keying mode symbols constitute a subset of the first mode keying symbols.

Figures 8, 9:
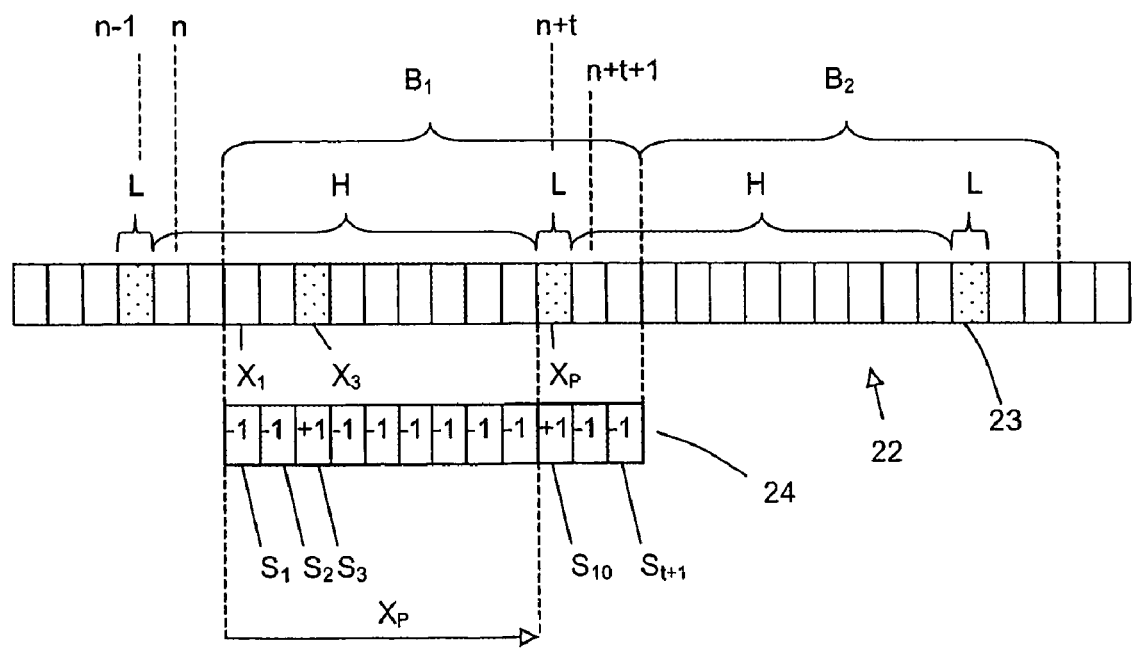
FIG. 8 shows an exemplary frame-format for the transmitted data according to the first embodiment of the invention.
FIG. 9 shows an exemplary frame alignment procedure for the received symbols according to the first embodiment of the invention.

The way the first and second keying modes are distributed over time has been illustrated in FIG. 8.

It is noted that the invention is not restricted to 128QAM/4QAM for the first/second keying mode, but that many other combinations, wherein the first keying mode is of a higher order than the second keying mode, could be used.

As indicated by the cross in bold lines in FIG. 6, detection of the four distinct symbols in the second keying mode is more easily accomplished due to the enhanced distance to the neighbouring symbols and the detection boundaries. The exemplary vector B illustrates that the receiver may detect a "distorted" signal for a symbol that was mapped at co-ordinate (7,7). If the signal is within the error area at coordinates (0, 9) the receiver will still detect that the symbol should reflect a symbol value (7,7), which could be assigned to the two-bit word 11. In comparison with exemplary vector A, in FIG. 5, it is seen that the error margin is much larger in the second keying mode than the first keying mode.

It appears that, since the error signal 16 can obtain greater values for the second lower order keying mode L than the higher order keying mode H, the system is capable of providing coherent detection under far greater errors, than if the first higher order keying mode was used exclusively. Once the synchronisation is established, an enhanced—and more correct—error signal may adjust the IF generator, every time a lower keying order symbol is transmitted.

Moreover, since the second lower-order keying mode is intended to be inserted at a relative high rate and the demodulator can correctly adjust the IF generator 12 in a larger area relatively frequent, the possibilities for correctly decoding signals on a heavily disturbed channel are enhanced. The transmission is rendered more robust for the cost of a slightly impaired data capacity.

When comparing the constellations of FIGS. 5 and 6, it appears that the average energy of the first keying mode signal and the second keying mode signal are comparable, as their average envelope are about the same.

Before correct mapping can be carried out, the de-mapper 14 must know which keying mode was utilised for modulating a given symbol in the received signal. The present invention may realise synchronisation in a number of different manners.

A routine according to the first embodiment of the invention residing in frame-aligner 15 provides continues monitoring of the incoming signal. If we assume that data is randomly distributed, it is noted that the coinciding symbols (7, 7; 7, −7; −7, 7; −7, −7) will occur more frequent than the remaining symbols represented in FIG. 3, as the coinciding symbols always appear when the second keying mode is utilised.

In FIG. 9, the procedure for frame synchronisation according to the first embodiment has been shown. The incoming string 22 comprises symbols according to the first higher-order keying mode H and to the second lower-order keying mode L, respectively. Symbols belonging to the group of coinciding symbols, i.e. any of the symbols of FIG. 6, have been indicated by dotted fields 23, whereas the 124 symbols of FIG. 5 not belonging to the coinciding symbols (i.e. the 128-4 symbols) are indicated by blank fields.

The aligner 15 continuously monitors frames (B1 and B2) of incoming symbols of length t+1 and for each incoming frame, incoming symbols are ordered according to their position in the frame (B).

Each incoming symbol is assigned to a given field of a register 24 having a number of fields $S_1$-$S_{t+1}$ corresponding to the number of symbols t+1 in the frame, whereby a symbol of a given frame position is assigned a field of a corresponding order number.

For this purpose, fields $S_1$-$S_{t+1}$ of register 24 are continuously updated. Each field in register 24 contains a commutative integer value to which the number 1 is added if in the given frame a symbol belonging to the overlapping group (dotted) is detected, and the value −1 is added if another symbol (blank) appears. In the present example the value +1 is added to registers S3 and S10, while the value −1 is added to the remaining fields of the register 24.

Over time, it will appear that a certain field in register 24 has a positive value while the remaining values are negative. The particular register which turns positive indicates the position in the string 22, where a symbol of the second keying mode appears in the given frames B1, B2. Thereby, the data 20 can be aligned or synchronised with the incoming string of symbols. In the present example, field S10 will indicate the cyclic position of the second keying mode symbols.

According to a second embodiment of the invention data are mapped into symbols shown in FIG. 7 in the second mode L, while the first mode symbols of FIG. 5 is used. As appears, the symbol constellations of the first and second modes do not coincide.

Since the symbols of FIG. 7 represent a larger signal envelope than the symbols of FIG. 5, the distinction of which symbols should be mapped to the first respectively the second keying mode can be accomplished by frame aligner 15, by discriminating on the signal envelope.

Moreover, according to a third embodiment, a frame alignment word, utilising either modulation according to the first or second keying mode, is used to align frames. The framewords appear cyclically, e.g. at a frequency of 1000-10,000 frames.

For all above embodiments, for severe channel conditions, one symbol of the second keying mode is for example inserted for every 5-20 symbols of the first keying mode.

For better channel conditions, one symbol of the second keying mode is for instance inserted for every 100 symbols of the first keying mode.

According to a fourth embodiment, the rate of inserting symbols of the second mode in the stream of symbols of the first keying mode—in the following, the insertion rate—varies dynamically with conditions.

Figure 10:
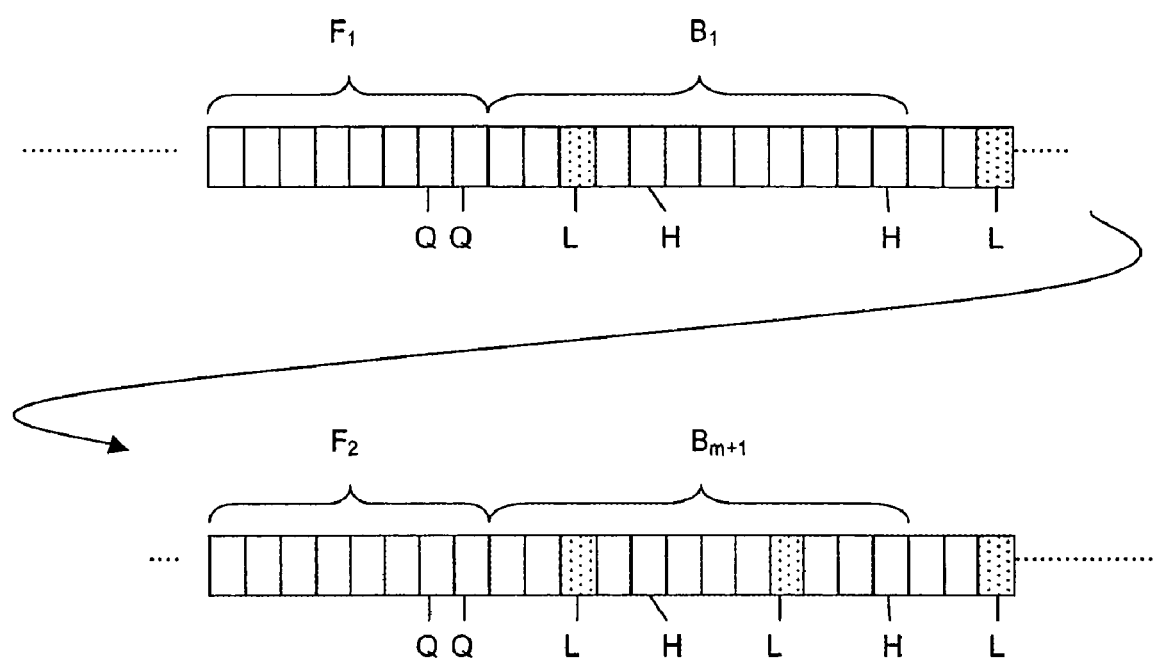
FIG. 10 shows an exemplary variable insertion rate procedure according to a fourth embodiment of the invention.

This embodiment has been illustrated in FIG. 10. Frame alignment words, for instance appearing at every 10,000 symbols, indicate which insertion rate applies. A portion Q of a frame-word indicates which class of insertion rates and corresponding predetermined frame patterns are used for subsequent frames. Advantageously, the insertion rate is varied dynamically in dependence on the current quality level that characterises the channel. The first frame-word F1 indicates that a first insertion rate of one second-order-keying-mode symbol is used per frame B1 at a first channel quality. The second frame-word F2 indicates that a second insertion rate of two second-order-keying-mode symbols is used per frame B1+m at a second channel quality, which is impaired in comparison to the first quality.

Preferably, the rate is doubled, halved or unchanged for every new frame alignment word within a certain range of possible alternatives. Conventional bit error rate measurements based on checksum operations could be used to estimate the channel quality.

For this reason, a conventional return channel (not shown) is provided for signalling the received quality level back to the transmitter.

For all above embodiments it applies that, at the start of a communication session, dummy data corresponding to a number of frames of symbols could be processed such that the synchronisation can be performed. For instance, dummy data are sent during an initialisation phase in which a number of frames of random information are sent. Data can also be re-transmitted during the initialisation phase. When synchronisation has been established and it is found that the bit error rate attain an acceptable level, for instance, the operative traffic phase can be adapted, whereby only traffic data is transmitted using the first and second keying modes. The bit error rate can be examined by normal checksum operations. Such methodologies are frequently used in higher protocol layers of the OSI (open standard interface) model, to which the present invention may be used.

Figure 12:
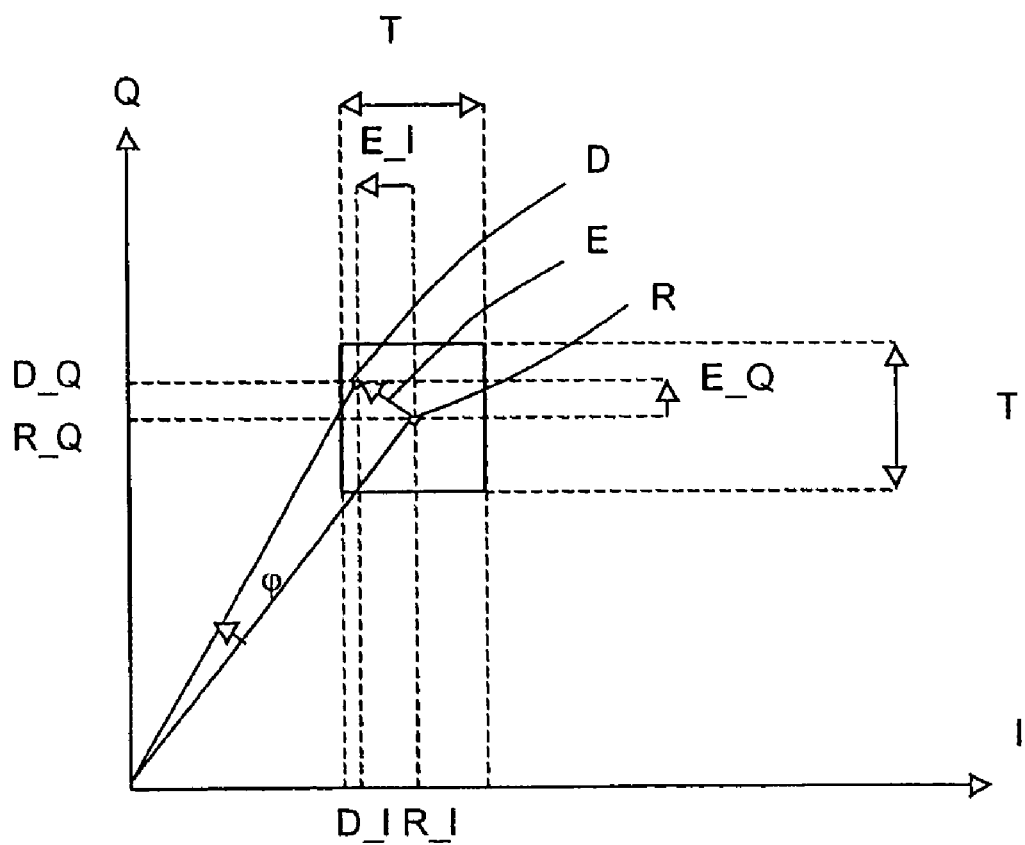

As mentioned above, an error signal vector E corresponding to the deviation of the detected symbol value D from an expected reference symbol value R is detected in de-mapper 14 and is fed into PLL loop back filter 13, which deviates a control value E', also denoted deviated error signal. For instance E' may relate to the angle φ between vectors for points D and R. The latter signal is used to adjust IF generator IF 12, so that it is rendered coherent with the signal of IF6. In FIG. 12, the above relations have been shown.

The estimation of the error control value E' depending on the vector E can be accomplished in many ways, whereby two preferred embodiments according to the invention are mentioned here:

According to a first aspect, the constellation area is divided into 4 sectors for which the error control signal is determined as follows:

$$\text{for sector A} - |D_{\_Q}| \geq |D_{\_I}| : E' = E_{\_I} \qquad \text{I}$$

$$\text{for sector B} - |D_{\_Q}| < |D_{\_I}| : E' = E_{\_Q} \qquad \text{II}$$

According to a further aspect, the constellation area is divided by four lines through the origin into 3 sectors, A, B and C. The definition of these sectors and the weighted error value used for detected symbols in the associated sectors are given as follows:

| III: | for sector A – $|D\_Q| \geq 2 \cdot |D\_I|$: | $E' \equiv E\_I$ |
|---|---|---|
| IV: | for sector B – $|D\_Q| < \frac{1}{2} \cdot |D\_I|$: | $E' \equiv E\_Q$ |
| V: | for sectors non A, non B: | $E' \equiv \dfrac{E\_I + E\_Q}{2}$ |

Figure 11:
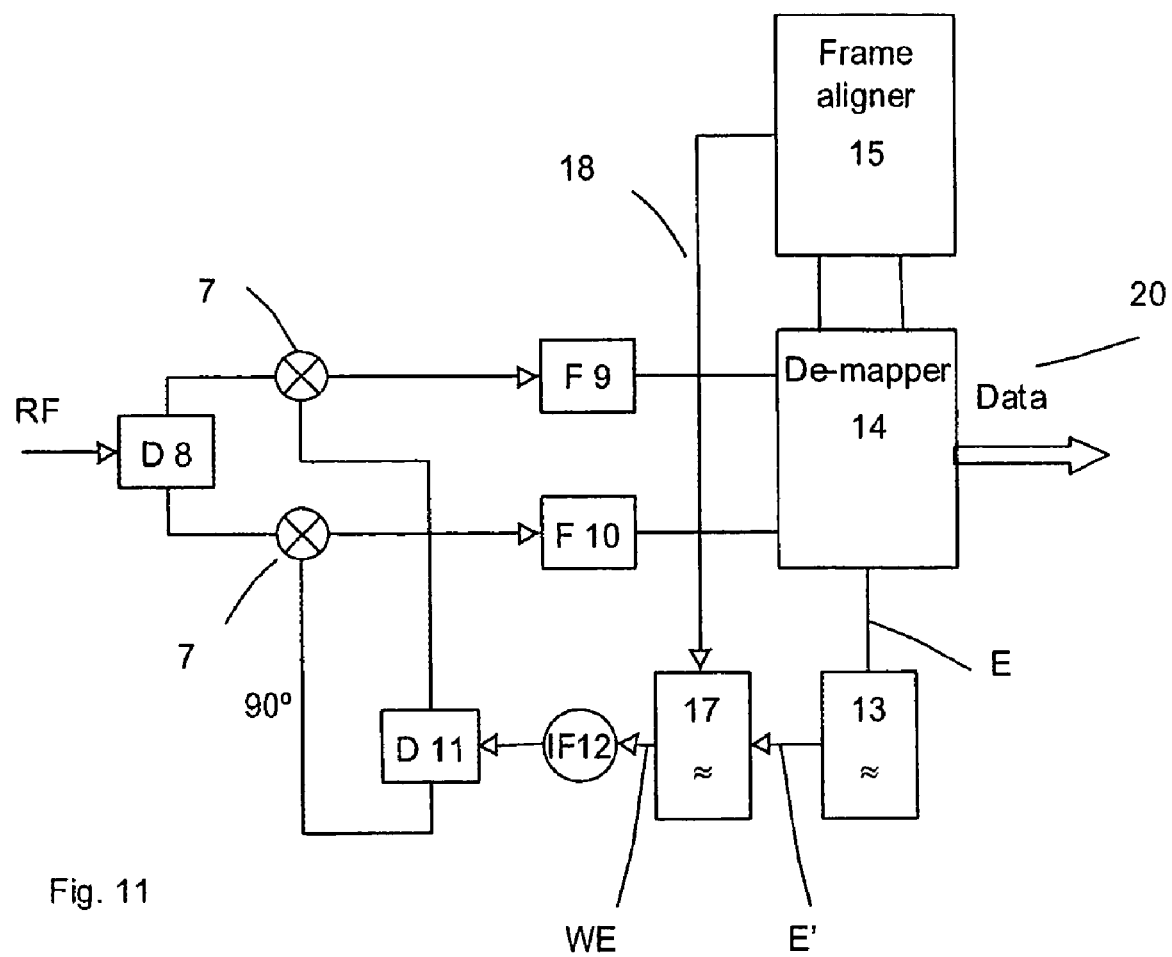
FIG. 11 shows an exemplary receiver according to the invention,
FIG. 12 discloses an error signal vector E and other values,
FIG. 13 discloses an preferred weighting function according to a preferred embodiment of the invention, and
FIG. 14 discloses an alternative heightening function according to the invention.

According to a further embodiment of the invention, a weighting function is used as performed by exemplary receiver shown in FIG. 11. The receiver is similar to the one shown in FIG. 2, except that a weighting filter 17 is provided.

One common noise contributor is related to the thresholds of the QAM decision device, i.e. the contribution of noise when the detected symbol approaches the square shaped symbol detection boundaries for instance shown in FIG. 5. In those cases where the noise component is larger than the distance to the symbol boundary, the error signal will get a wrong sign, which will disturb the PLL tracking heavily.

According to the invention, this effect can be reduced by applying the above weighting function that suppresses the detector output for points close to the boundaries.

The weighting can be accomplished in a number of ways. However, it is a basic objective to reduce the sharp transitions in the detector output when the detected signal D approaches the decision boundaries, which otherwise would result in the typical "sawtooth" shape of the detector vs. phase error response and to subdue responses outside the detector boundaries.

According to a preferred embodiment of the invention the following relation is used for weighting the occurring symbol error:

VI:

$$WE = E'\left(1 - \frac{2W}{T}\right) \text{ for } -1/2T \leq E' \leq 1/2T$$

where T corresponds to the boundary size as indicated in FIG. 12 and E' corresponds to deviated control error and W=Max {abs(E_I); abs(E_Q)}, and $$WE = 0 \text{ for } E' < -\tfrac{1}{2}T \lor \tfrac{1}{2}T < E' \qquad \text{VII}$$

where T corresponds to the boundary size as indicated in FIG. 12 and E' corresponds to deviated control error.

The above weighting will result in a parabolic shape of the detector vs. phase error response. The error weighting has been illustrated by line 26 in FIG. 13.

According to an advantageous embodiment of the invention, the weighting function above is used in connection with the symbols coded according to the first keying mode (H) line 26 but not the second keying mode (L)-line 28. According to the determination made by frame aligner 15, it is signalled on line 18 whether a symbol coded according to the first keying mode is received. If this is the case, weighting filter 17 is controlled to apply the weighting function as denoted by line 26, otherwise the (non-weighted) weighting function according to line 28 is used.

Figure 13:
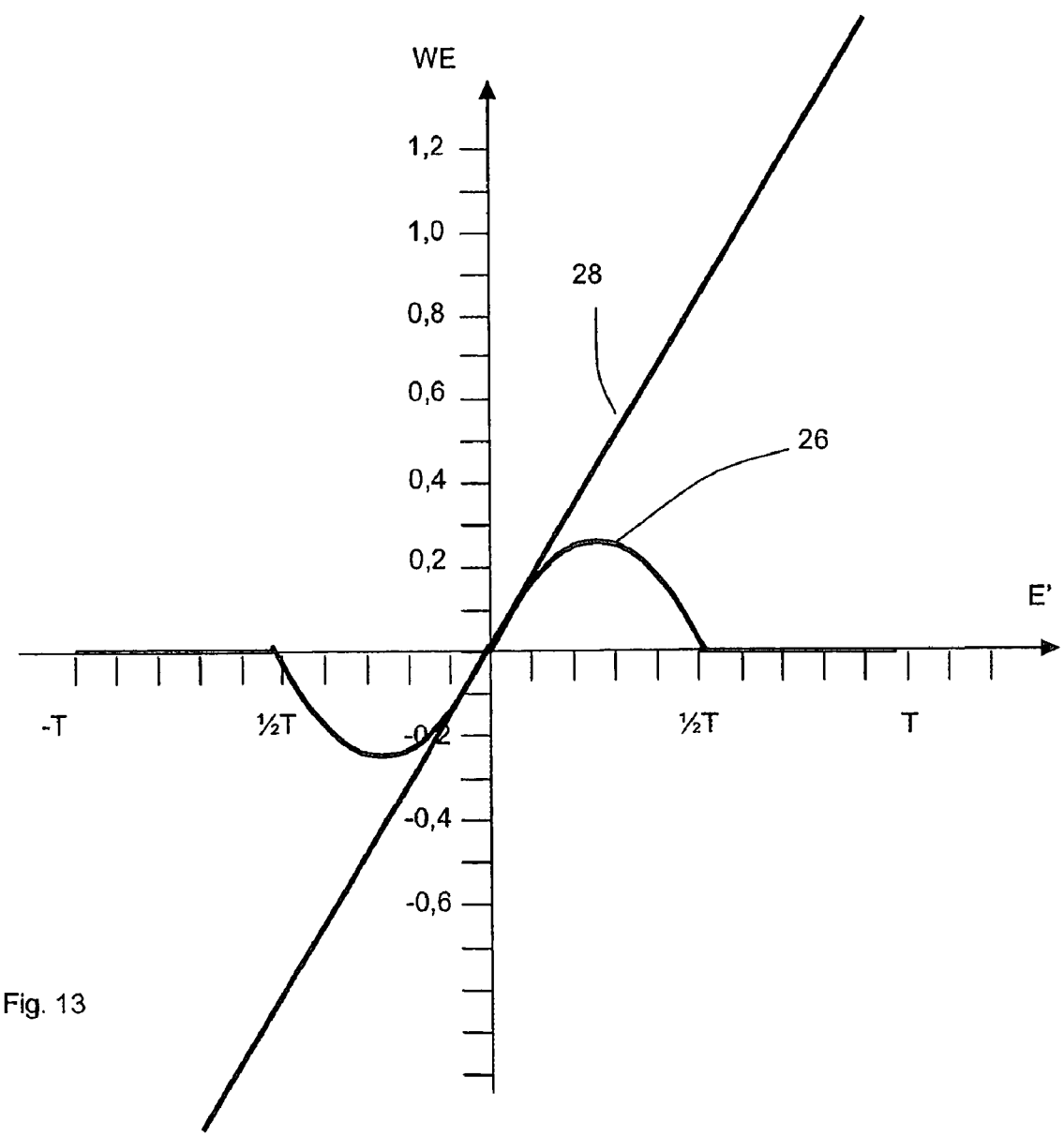

As appears from FIG. 13, the false phase errors (WE), which otherwise would have occurred, if no weighting function were utilised are substantially reduced. Consequently, the possibilities for erroneously adjusting the PLL loop have been reduced.

The phase errors of the second keying mode, as illustrated by line 28 in FIG. 13, on the other hand, are not weighed and are fully contributing to adjusting the PLL loop, every time—according to the invention—the symbols of the second keying mode appears in the stream of symbols.

Figure 14:
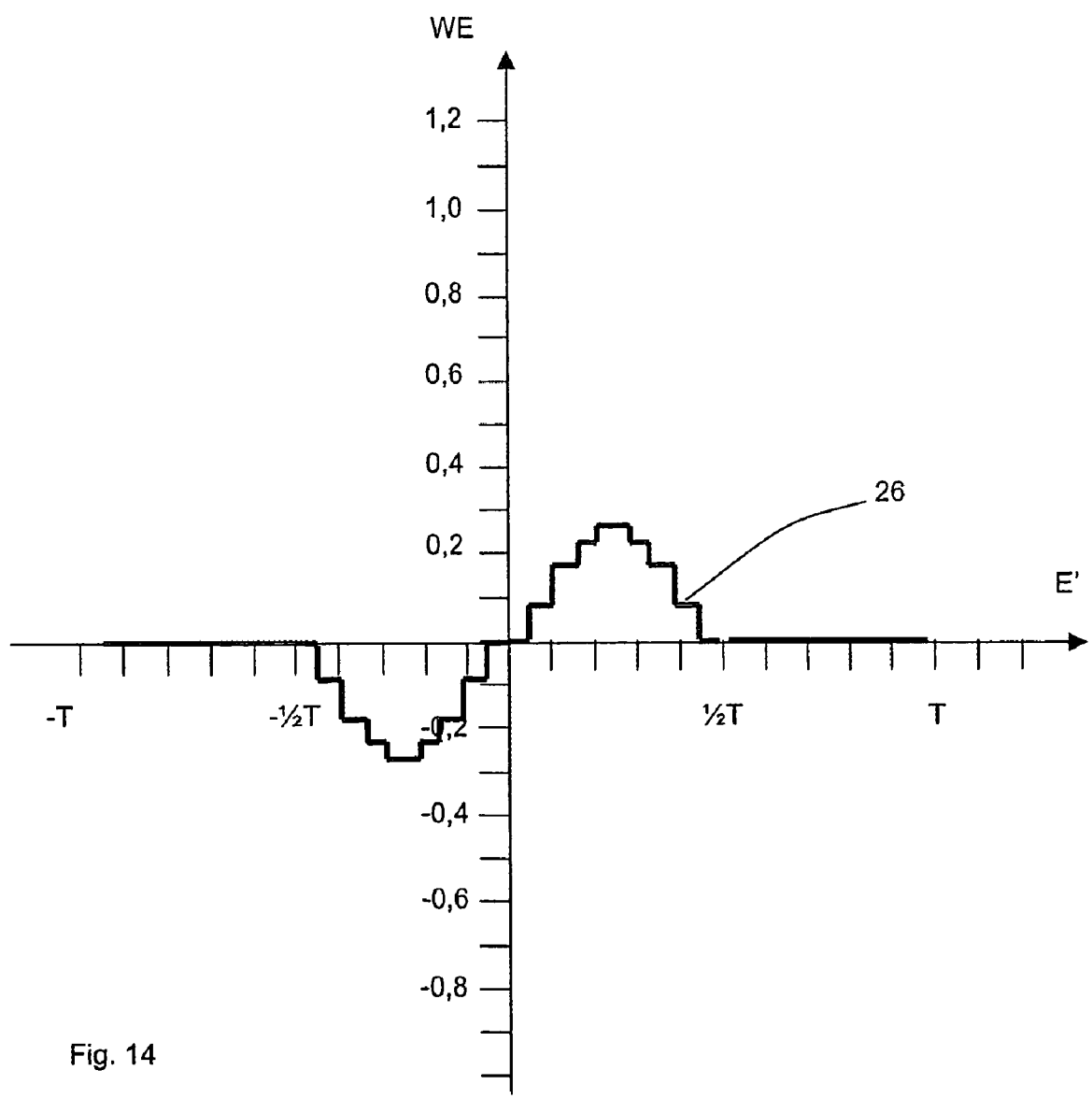

In FIG. 14, an alternative weighting function using discrete values has been shown.

Returning now to the benefits of the invention, since no pilot symbols are used and hence only information is transmitted, a particular high bandwidth-efficiency is accomplished. The transmission is rendered very robust due to the provision of the high-amplitude error vectors accommodated during the second keying mode. The present invention may advantageously be used with FEC (forward error correction coding) and this is favourable especially for channels with a high degree of disturbances.

The error correction capabilities of FEC algorithms are typically reduced in case of high burst error probabilities. Burst errors are usually related to the phase tracking capability of the receiver and since this capability is improved by the invention, the overall benefits of the invention are enhanced for a FEC coded channel.

The invention claimed is:

1. A method of receiving transmitted digital data in a receiver, comprising the steps of,
   cyclically transmitting frames comprising:
   a first number of symbols according to a first keying mode using a first constellation;
   a second number of symbols according to a second keying mode using a second constellation, whereby the first constellation includes more signaling points than the second constellation; and
   the first and second keying modes being used at predetermined positions in the frame, whereby both the symbols according to the first and second keying mode carry information under at least an operative traffic phase; and
   applying a weighting function in the receiver to an error control signal for symbols coded according to the first keying mode, wherein the error control signal is reduced when the detected error control signal approaches decision boundaries of the first keying mode; and
   subduing responses outside the decision boundaries of the given detected symbol of the first keying mode, wherein no weighting function is applied to symbols associated with the second keying mode.

2. The method according to claim 1, wherein the number of symbols sent under the second keying mode in a frame amounts to 1.

3. The method according to claim 2, wherein during reception,
   for each incoming frame, ordering incoming symbols according to their position in the frame,
   assigning each incoming symbol to a given field of a register having a number of fields, the number of fields corresponding to the number of symbols in the frame, whereby each field comprises a cumulative value, and whereby a symbol of a given frame position is assigned a field of a corresponding order number,
   updating the cumulative value of the given field in the register with a first value if the respective symbol belongs to the second constellation, otherwise updating the respective field with a second value,
   performing updates of multiple incoming frames of symbols,
   from the accumulative values of the respective fields establishing at which positions in the incoming frame the first, respectively the second, keying mode is used.

4. The method according to claim 1, wherein the second constellation is a subset of the first constellation.

5. The method according to claim 1, wherein the second constellation comprises at least two signaling points.

6. The method according to claim 1, wherein 1 symbol out of 5-20 in a frame is modulated according to the second keying mode.

7. The method according to claim 1, wherein 1 symbol out of 20-100 in a frame is modulated according to the second keying model.

8. The method according to claim 1, further comprising the step of inserting periodically a frame alignment word after a plurality of frames is transmitted, the alignment word comprising a sequence of predetermined symbols.

9. The method according to claim 8, wherein a frame alignment word is inserted for every 1000-10,000 symbols.

10. The method according to claim 8, wherein the frame alignment word indicates which one of a predetermined group of insertion rates is used after the frame alignment word, an insertion rate pertaining to a predetermined rate of symbols being inserted according to second keying order mode in relation to the symbols of the first keying order mode.

11. The method according to claim 10, wherein the insertion rate depends on the given channel conditions.

12. The method according to claim 11, wherein a measured bit error rate at the receiver is used to decide which insertion rate is used for modulation.

13. The method according to claim 1, wherein a parabolic weighting function is utilized inside the decision boundaries of the first keying mode.

14. The method according to claim 1, wherein the method is used in combination with forward error correction coding.

* * * * *

UNITED STATES PATENT AND TRADEMARK OFFICE
CERTIFICATE OF CORRECTION

PATENT NO. : 7,567,501 B2  
APPLICATION NO. : 10/519610  
DATED : July 28, 2009  
INVENTOR(S) : Weinholt et al.

Page 1 of 1

It is certified that error appears in the above-identified patent and that said Letters Patent is hereby corrected as shown below:

In Fig. 13, Sheet 9 of 10, for axis "WE", delete "," and insert -- . --, therefor at each occurrence.

In Fig. 14, Sheet 10 of 10, for axis "WE", delete "," and insert -- . --, therefor at each occurrence.

In Column 2, Line 7, delete "20.000" and insert -- 20,000 --, therefor.

In Column 3, Line 6, after "4" delete "s" and insert -- is --, therefor.

In Column 6, Line 13, under Equation "I", delete "A —|$D\_Q|\geq|D\_I|$:" and insert -- A - $|D\_Q| \geq |D\_I|$: --, therefor.

In Column 6, Line 15, under Equation "II", delete "B —|$D\_Q|<|D\_I|$:" and insert -- B - $|D\_Q| < |D\_I|$: --, therefor.

Signed and Sealed this

Twenty-second Day of December, 2009

David J. Kappos
*Director of the United States Patent and Trademark Office*